United States Patent
Suwa et al.

(10) Patent No.: US 7,436,539 B2
(45) Date of Patent: Oct. 14, 2008

(54) IMAGE PROCESSING APPARATUS, IMAGE PROCESSING METHOD, STORAGE MEDIUM STORING A PROGRAM READABLE BY A COMPUTER AND PROGRAM

(75) Inventors: Tetsuya Suwa, Kanagawa (JP); Tomoyuki Watanabe, Tokyo (JP); Hirokazu Ishii, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 680 days.

(21) Appl. No.: 10/910,541

(22) Filed: Aug. 4, 2004

(65) Prior Publication Data
US 2005/0030585 A1 Feb. 10, 2005

(30) Foreign Application Priority Data
Aug. 8, 2003 (JP) .............................. 2003-206829

(51) Int. Cl.
G06F 3/12 (2006.01)
G06F 12/00 (2006.01)
G06F 13/00 (2006.01)
H04N 1/50 (2006.01)
H04N 1/21 (2006.01)

(52) U.S. Cl. .............. 358/1.16; 348/207.2; 358/426.04; 358/426.05; 358/1.9; 358/444; 711/100; 382/233

(58) Field of Classification Search ................. 382/233, 382/254; 358/1.9, 1.16, 426.04, 426.06, 358/444; 348/207.2; 711/100
See application file for complete search history.

(56) References Cited

U.S. PATENT DOCUMENTS

| | | | | |
|---|---|---|---|---|
| 5,287,203 A | * | 2/1994 | Namizuka .................... | 358/443 |
| 5,479,587 A | * | 12/1995 | Campbell et al. ........... | 358/1.17 |
| 5,615,314 A | * | 3/1997 | Schoenzeit et al. ......... | 358/1.15 |
| 5,710,638 A | * | 1/1998 | Yamamoto et al. .......... | 358/404 |
| 5,798,843 A | * | 8/1998 | Yamamoto et al. .......... | 358/404 |
| 6,416,410 B1 | * | 7/2002 | Abou-Samra et al. ......... | 463/31 |
| 6,496,605 B1 | | 12/2002 | Osa | |
| 6,717,613 B1 | | 4/2004 | Osa | |
| 6,882,440 B1 | * | 4/2005 | Nitta .......................... | 358/1.16 |
| 2003/0228067 A1 | * | 12/2003 | Miyake et al. ............... | 382/275 |
| 2004/0080790 A1 | * | 4/2004 | Abe ............................ | 358/3.13 |

FOREIGN PATENT DOCUMENTS

EP  1 040 929  10/2000

(Continued)

*Primary Examiner*—Samir A Ahmed
*Assistant Examiner*—Stephen R Koziol
(74) *Attorney, Agent, or Firm*—Fitzpatrick, Cella, Harper & Scinto

(57) ABSTRACT

At the image processing time for an image data, a storage area to be secured is reduced, and moreover, the number of access processing times for the storage area which is required until the image processing result is obtained is sharply reduced, thereby shortening the processing time. Consequently, an image correction processing portion is characterized by a configuration wherein the image correction processing portion secures an image correction buffer to store the image data for at least M+(N−1) lines, and when it is determined that an image correction processing requires decoding processing, the address of an image correction buffer is set as a decoding destination, and the image correction processing for the image data is performed within the set storage area.

7 Claims, 18 Drawing Sheets

FOREIGN PATENT DOCUMENTS

| | | | |
|---|---|---|---|
| EP | 1040929 | * | 10/2000 |
| JP | 6-217094 | | 8/1994 |
| JP | 7200815 | | 8/1995 |
| JP | 8194812 | | 7/1996 |
| JP | 10-32709 | | 3/1998 |
| JP | 10098722 | | 4/1998 |
| JP | 2000-156830 | | 6/2000 |

* cited by examiner

FIG. 7

| (R,G,B) | (C,M,Y,K,LC,LM) |
|---|---|
| (0,0,0) | (0,0,0,255,0,0) |
| (0,0,16) | (18,16,0,246,0,0) |
| (0,0,32) | (33,31,0,224,0,0) |
| ⋮ | ⋮ |

| | |
|---|---|
| ⋮ | ⋮ |
| (255,255,240) | (0,0,15,0,0,0) |
| (255,255,255) | (0,0,0,0,0,0) |

FIG. 16
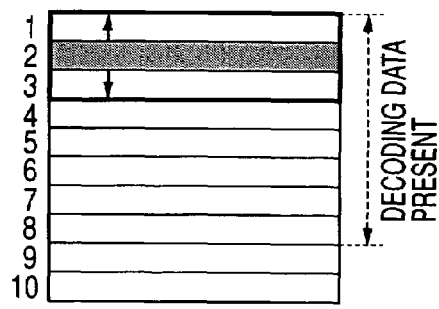
FIG. 17A
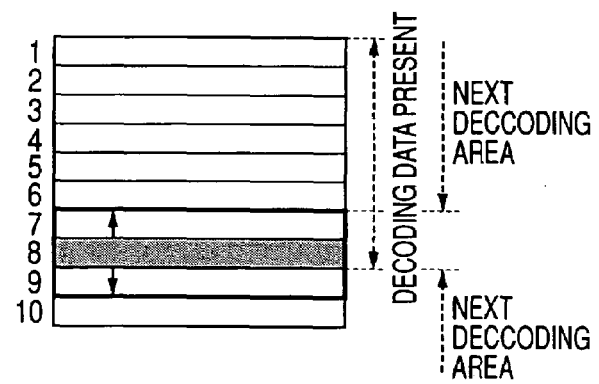
FIG. 17B
FIG. 17C
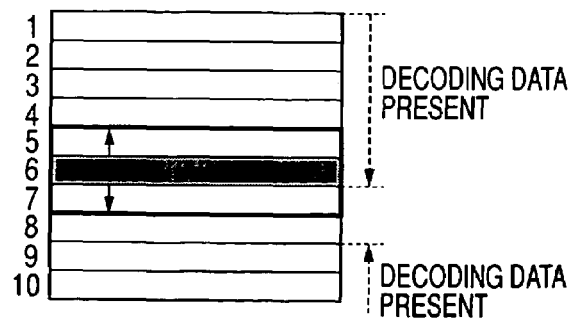

MEMORY MAP OF STORAGE MEDIUM

IMAGE PROCESSING APPARATUS, IMAGE PROCESSING METHOD, STORAGE MEDIUM STORING A PROGRAM READABLE BY A COMPUTER AND PROGRAM

This application claims priority from Japanese Patent Application No. 2003-206829 filed on Aug. 8, 2003, which is hereby incorporated by reference herein.

BACKGROUND OF THE INVENTION

1. Field of the Invention

The present invention relates to an image processing apparatus and an image processing method performing a predetermined image processing for image data and a storage medium storing a program readable by a computer and a program.

2. Related Background Art

Swallowed up by the waves of digitalization in the recent years, a typical digital camera instead of the conventional silver camera has rapidly dominated in the market. This is believed linked to easiness of handling of digitalized image data due to popularization of personal computers (hereinafter, referred to as PC) among many people.

In addition to the above, due to highly developed semiconductor manufacturing technologies, high-pixel and high-resolution images taken by the digital camera have given a boost to this phenomenon.

Moreover, accompanied with advanced and sophisticated features of mobile equipment such as cellular phones and PDA, the equipment mounted with the digital camera has come onto the market, and even those who do not have the PC have a myriad of opportunities to come in contact with digital photography.

For these users, a printer capable of printing without being connected to the PC has appeared on the scene so that the printing can be made without the intermediary of the PC. This has been realized by allowing a printer main body to have the image processing function performed by the host side PC.

FIG. 19 is a block diagram to explain a data processing state of the conventional image processing apparatus and, for example, shows one example of an image processing, which is performed by a printer as the image processing apparatus.

In FIG. 19, reference numeral 101 denotes a decoding processing portion, which decodes an image data encoded into a compressed format such as a JPEG (Joint Photographic coding Experts Group: ISO/IEC ITU-TT. 81 or ISO/IEC IS 10918-1). Here, for the image data encoded into the JPEG format, an entropy decryption, a reverse quantization, and a reverse DCT conversion are performed, thereby executing a decoding processing. The detailed description of each processing will be omitted since it has nothing to do with the substance of the present patent application. By this decoding processing, the image data of a luminance (Y) and a color difference (Cb and Cr) format is generated in a unit of 8×8 pixels.

Reference numeral 102 denotes a color processing portion, which subjects the image data decoded by a YCbCr format to an image correction and a color conversion processing, and converts it into ink colors of the printer.

Reference numeral 103 denotes an image correction processing portion, which is capable of executing various processings such as a correction of a white balance of the image, an exposure correction, a correction processing to a monochrome or a sepia, a removal of CCD noises contained in the image taken by the digital camera, a filtering processing of low pass/high pass and the like.

Subsequently, a color conversion processing portion 104 subjects the image data corrected by the YcbCr format to a conversion processing to the ink colors of the printer, for example, Cyan, Magenta, and Yellow.

The image data converted into the ink colors is transferred to a quantization processing portion 105 so as to be converted into tones printable by the printer.

As for the method of the quantization processing, an error diffusion method, a dither method using a matrix and the like can be cited. Through these processes, the data of the ink colors of the printer is transferred to a recording control portion (not shown) of the printer as printable tone data.

FIG. 20 is a block diagram to explain the detail of the data processing in the color processing portion 102 shown in FIG. 19, which explains a writing/reading state of the image data to a buffer in the color processing portion 102.

In FIG. 20, reference numeral 201 denotes a decoding processing, which prepares a decoding buffer 202 of the multiples of eight lines because the image comes to be decoded with a unit of 8×8. In this example, the data stored in the decoding buffer 202 is copied in an image correction buffer 204 for the image correction, in which a desired processing is executed. The number of lines of the image correction buffer 204 at this time is determined according to the content of the processing.

For example, if the processing is reduction processing of the CCD noises to be described later, the processing is of 17 lines, and if the processing is filter processing using a 3×3 matrix for the JPEG complex data disclosed in Japanese Patent Application Laid-Open No. H10-32709, the processing is of three lines. The data subjected to the correction processing is written to a color conversion buffer 206 for every one line, and color conversion processing is executed at the above-described color conversion processing portion 205.

In the color conversion processing portion 205, the converted data is overwritten on the same color conversion buffer 206, so that the storage capacity of a memory can be reduced. Further, the reason why a processing unit is one line each is because it is to reduce the storage capacity of the memory as small as possible.

After one raster data processing is performed in the image correction processing portion 203, when the next one line is required for the image correction buffer 204, a request for one line is submitted to the decoding processing portion 201. When one line exists in the decoding buffer 202, the raster data thereof is delivered to the image correction processing portion 203, and the image correction processing portion 203 performs the processing of writing it in the image correction buffer 204. When the raster data to be transmitted does not exist in the decoding buffer 202, the decoding processing portion 201 executes the decoding processing, and generates a raster data of the multiples of eight in the decoding buffer 202 and delivers a desired raster data to the decoding buffer 202.

In this manner, even when a data for eight lines is created by the decoding processing at one time as in the case of the JPEG image, it is possible for the image correction portion 203 to submit a request for one line unit by the decoding buffer 202 having a size of the multiples of eight lines. By repeating this processing, the color processing portion 208 delivers one line data, which has executed the image correction 203 and the color conversion processing 205, to a quantization processing portion 207.

The conventional image processing apparatus is configured as described above. In the case of the configuration (built-in system printer) where such a printer main body has an image processing function, it is difficult to have a high-capacity memory and a high-speed CPU if the cost of the printer main body is considered. Consequently, the built-in system printer is often by far inferior in its performance comparing to the host of the PC such as the storage capacity of a memory, CPU, the speed of an internal bus and the like.

A study is made of the case where a correction is performed on the image generated by multi-raster, which is represented by the JPEG. In the access to the buffer memory as described above in FIG. 20, when the writing processing is observed, there occur writing processes four times before reaching the quantization processing such as a writing in the decoding buffer, a writing in the image correction buffer, a writing in the color conversion buffer of the data subsequent to correction, and overwriting on the color conversion buffer of the data subsequent to the color conversion.

If a system is provided for a memory having high capacity and being accessible at a high speed as in the case of the PC, it does not cause a serious trouble as far as this point is concerned.

However, in the case where the memory capacity is strictly limited in the built-in system printer in which the printer main body has the image processing function, and in the case where the system is slow in the memory access, above all, in the writing processing, it becomes an important problem how to reduce the writing processing so as to reduce the memory capacity and speed up the memory access.

In Japanese Patent Application Laid-Open No. 2000-156830, an attempt is made such that the data decoded and subjected to a predetermined image processing is stored in a primary buffer, which temporarily stores the data, thereby speeding up the data processing. However, this causes an increase in the memory capacity, and a writing processing when the data is stored in the primary buffer.

Further, in Japanese Patent Application Laid-Open No. H06-217094, the speeding up of outputting the plural number of pages is realized while having a circular buffer (ring buffer) and maintaining the downsizing of the buffer and its efficiency. However, no consideration is given to an image correction generating the multi raster such as the conventional technology. Moreover, there has been a problem in that the reduction in the number of accesses is also left as a problem, for example.

SUMMARY OF THE INVENTION

It is an object of the present invention to provide an image processing apparatus and an image processing method in which, in addition to the reduction in the memory capacity, the number of accesses to the memory required for the image processing is reduced.

The present invention has been made to solve the above described problem, and a further object of the invention is to provide the image processing apparatus and the image processing method in which, when an image processing is executed for image data, a storage area to be secured is reduced, and moreover, the number of access processes for the storage area required until an image processing result is obtained is sharply reduced, thereby shortening processing time.

An object of the present invention is to provide the image processing apparatus and the image processing method having new functions.

Other features of the present invention will be apparent from the following description of the preferred embodiments of the invention and the accompanying drawings.

BRIEF DESCRIPTION OF THE DRAWINGS

FIG. 7 is a diagram showing one example of a LUT to which a color conversion processing shown in FIG. 6 refers;

FIG. 16 is a diagram to explain the configuration of a matrix used in the image processing apparatus to show a second embodiment of the present invention;

FIGS. 17A, 17B and 17C are diagrams to show an example of how to use the memory of the image correction buffer by the image processing apparatus according to the present invention;

DESCRIPTION OF THE PREFERRED EMBODIMENTS

<First Embodiment>

Preferred embodiments of the present invention will be described below in detail with reference to the accompanying drawings. In the present embodiment, not only a printer capable of printing a print image data received from an ordinary PC, but also a PC card slot (built-in slot for memory card) are available, and the image taken by a digital camera and recorded in the PC card is also printable. A recording apparatus (photo direct printer apparatus) adopting an ink jet system as a recording method is taken as an example and will be described.

Hereinafter, the preferred embodiments of the present invention will be described in detail with the accompanying drawings.

Figure 1:
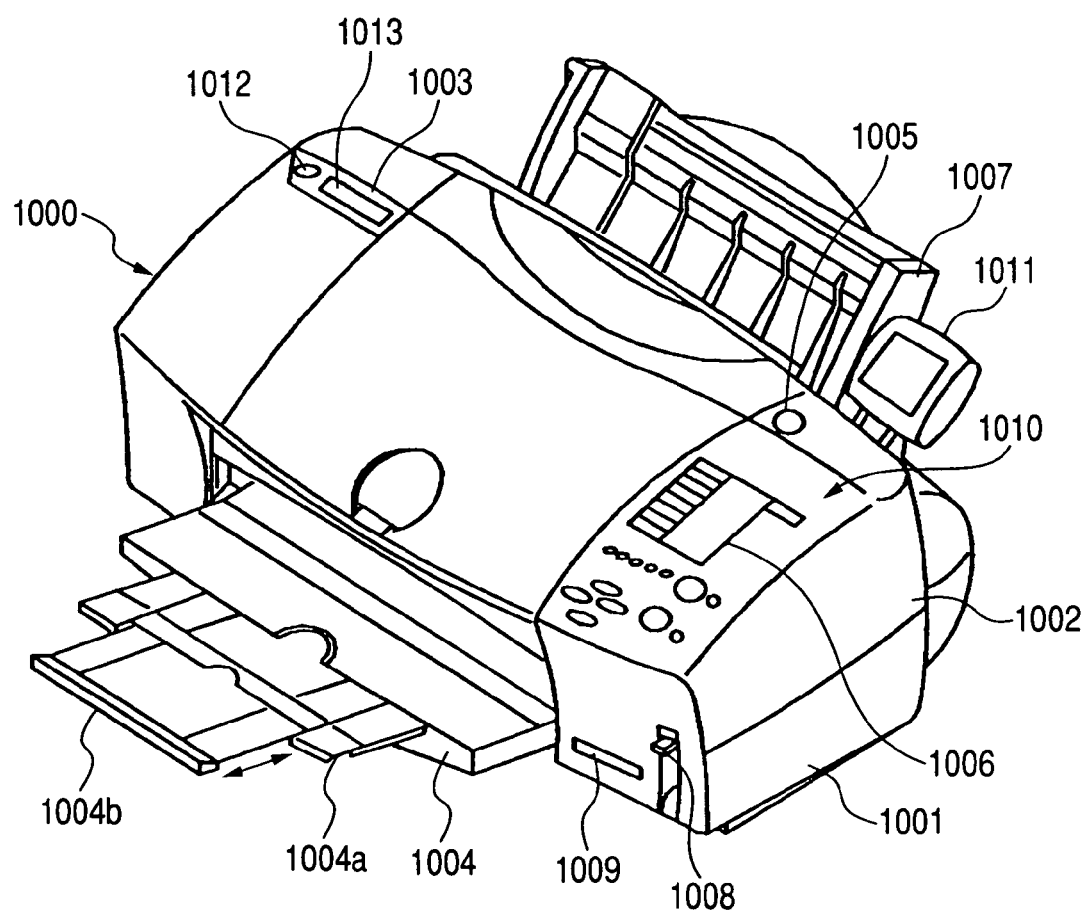
FIG. 1 is an external perspective diagram showing one example of an image processing apparatus showing a first embodiment of the present invention.

FIG. 1 is a schematic perspective diagram showing one example of an image processing apparatus to show a first embodiment of the present invention. A photo direct printer apparatus 1000 comprises a function as an ordinary PC printer for receiving and printing data from a host computer (PC), and a function for directly reading and printing image data stored in a storage medium such as a memory card or directly receiving and printing the image data from the digital camera.

In FIG. 1, a main body serving as an outer shell of the photo direct printer apparatus 1000 according to the present embodiment has external members consisting of a bottom case 1001, an upper case 1002, an access cover 1003, and a discharge tray 1004.

Further, the bottom case 1001 forms an approximate lower half of the photo direct printer apparatus 1000, and the upper case 1002 forms an approximate upper half of the main body, respectively, and the combination of both the cases configures a hollow body having a storage space to store each mechanism to be described later in its interior, and on the upper surface portion and the front surface portion thereof, there are formed openings, respectively.

Further, the discharge tray 1004 has its one end portion swingably held in the bottom case 1001, and its swinging allows an opening portion formed in the front surface portion of the bottom case 1001 to open and close. Consequently, when a recoding operation is to be executed, the discharge tray 1004 is swung to the front surface side to allow the opening portion to open, so that a recording sheet can be discharged therefrom, and at the same time, the discharged recording sheet can be stacked in order.

Further, the discharge tray 1004 stores two pieces of auxiliary trays 1004a and 1004b, and as the need arises, each tray is pulled out therefrom, so that the support area of paper can be magnified or reduced to a tri-level.

The access cover 1003 has its one end portion rotatably held by the upper case 1002, and allows an opening portion formed on the upper surface to be opened and closed, and by opening this access cover 1003, it is possible to replace a recording head cartridge (not shown), an ink tank (not shown) or the like stored in the interior of the main body. Although not particularly illustrated here, when the access cover 1003 is opened and closed, a protrusion formed on its rear surface allows a cover closing lever to rotate, and by detecting its lever rotational position by using a micro-switch and the like, an opening and closing state of the access cover can be detected.

Further, on the upper surface of the upper case 1002, there is provided a power key 1005, which is pressable downward. Further, on the right side of the upper case 1002, there is provided an operation panel 1010 comprising a liquid crystal display portion 1006, various key switches and the like. The configuration of this operation panel 1010 will be described later in detail with reference to FIG. 1. Reference numeral 1007 denotes an automatic sheet feeding portion, which automatically feeds a recording sheet into the apparatus main body. Reference numeral 1008 denotes a paper clearance select lever, which is a lever for adjusting a clearance between the recording head and the recording sheet.

Reference numeral 1009 denotes a card slot, into which an adaptor mountable with a memory card is inserted, and printing can be made by directly taking the image data stored in the memory card through this adaptor. As for the memory card (PC), there are available, for example, a compact flush (registered trade mark), a memory, a smart media, a memory stick and the like.

Reference numeral 1011 denotes a viewer (liquid crystal display portion), which is detachable or attachable to this apparatus main body, and is used for displaying an image for each frame, an index image and the like in the case where an image desired to be printed from among the images stored in the PC card is retrieved. Reference numeral 1012 denotes a terminal for connecting a digital camera to be described later, and reference numeral 1013 denotes an USB bus connector for connecting a personal computer (PC).

Figure 2:
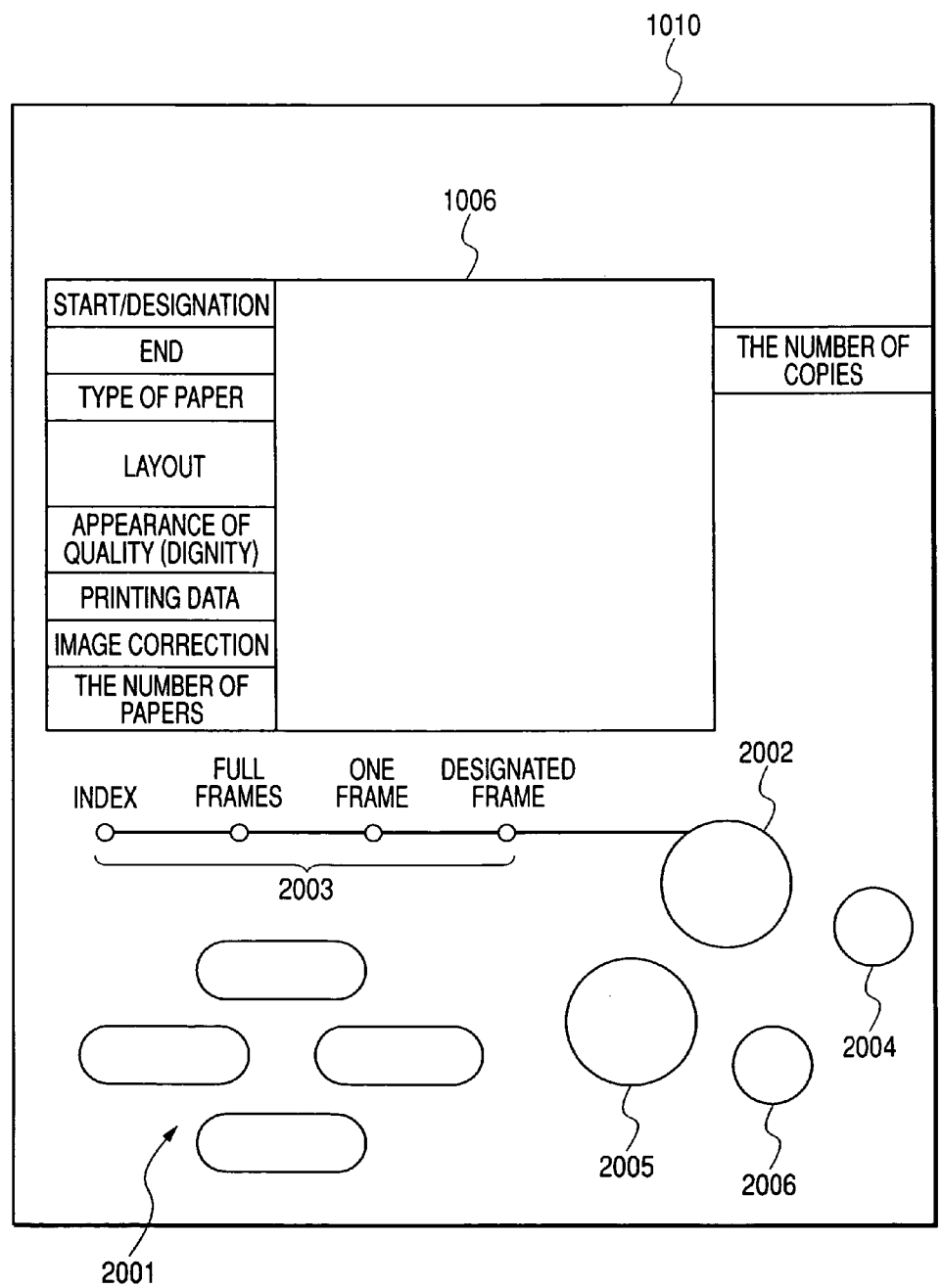
FIG. 2 is a schematic top diagram to explain the configuration of an operation panel shown in FIG. 1.

FIG. 2 is a schematic top diagram to explain the configuration of the operation panel 1010 shown in FIG. 1.

In FIG. 2, the liquid crystal display portion 1006 displays menu items for variously arranging the data regarding the items printed in the left and the right.

Here, as for the items to be displayed, there are: a headmost photo number in the scope desired to be printed; a designated frame number (start/-designated); a last photo number in the scope of printing desired to be completed (completion); the number of printed copies (copy); a type (sheet type) of sheet (recording sheet) to be used for printing; a setting (layout) of the number of photos to be printed in a piece of paper; a designation of the appearance quality of the printing (dignity); a designation as to whether a date photographed is printed or not (date printing); a designation as to whether a photo is corrected and printed (image correction); an indication of the number of papers required for printing (the number of papers) and the like.

Each of these items is selected or designated by using a cursor key 2001. Reference numeral 2002 denotes a mode key, and every time this key 2002 is pressed down, a type of printing (index printing, full frame printing, one frame printing and the like) can be switched over, and according to this switching, a LED corresponding to a LED 2003 is turned ON. Reference numeral 2004 denotes a maintenance key, which is a key for selecting the maintenance of a printer such as cleaning and the like of a recording head 1301 and printing area designation modes.

Reference numeral 2005 denotes a printing start key, which is pressed down when a start of the printing is instructed or the setting of the maintenance is to be fixed. Reference numeral 2006 denotes a printing stop key, which is pressed down when the printing is stopped or the cancellation of the maintenance is instructed.

Figure 3:
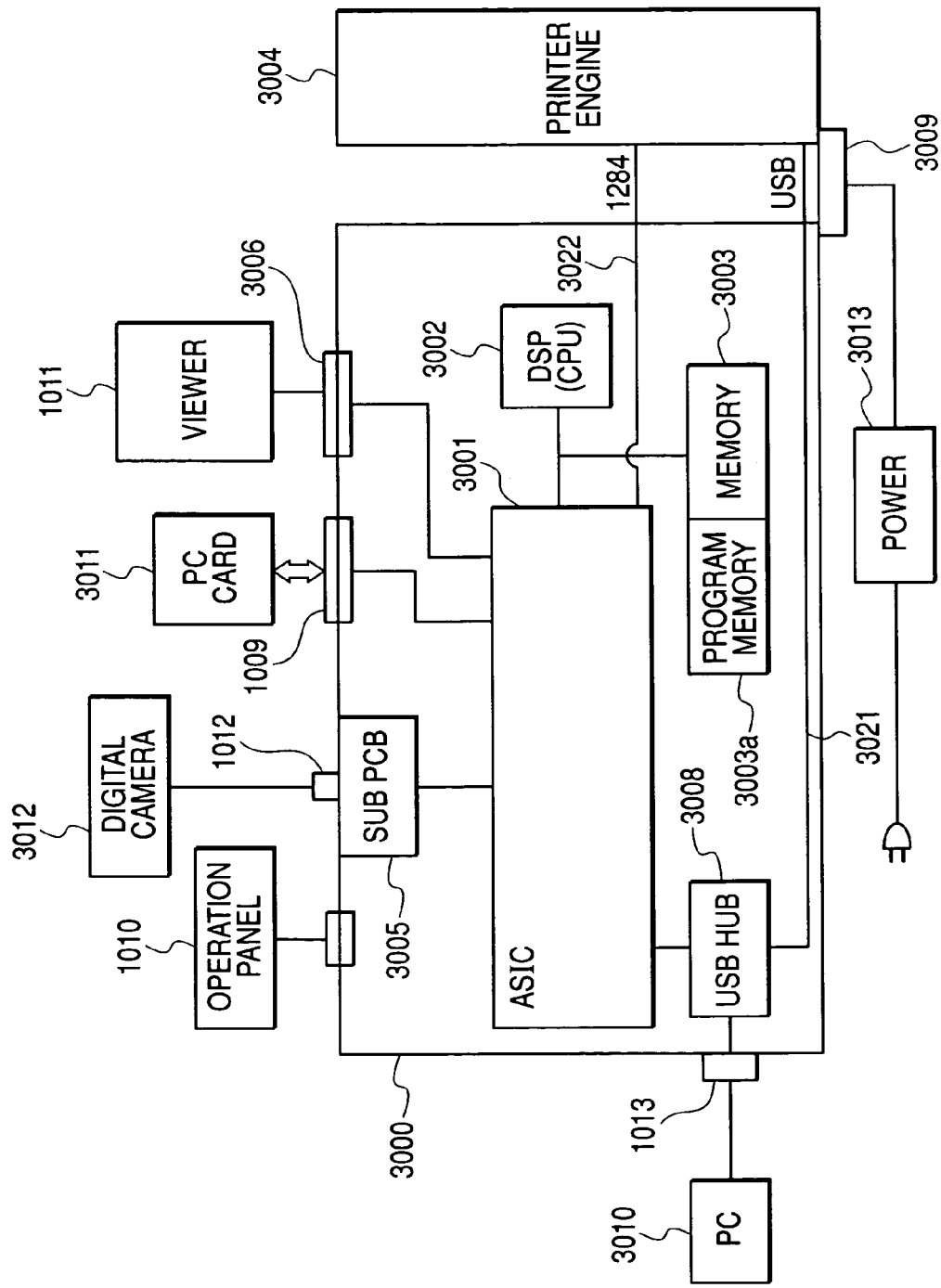
FIG. 3 is a block diagram to explain the configuration of the image processing apparatus shown in the first embodiment of the present invention.

FIG. 3 is a block diagram to explain the configuration of an image processing apparatus to show a first embodiment of the present invention, which corresponds to the configuration of main components related to the control of a photo direct printer apparatus shown in FIG. 1.

In FIG. 3, reference numeral 3000 denotes a control portion (control substrate). Reference numeral 3001 denotes an ASIC (application specific custom LSI), and its configuration will be described in detail later with reference to the block diagram of FIG. 6.

Reference numeral 3002 denotes a DSP (digital signal processor), which has a CPU in its interior, and is in charge of the image processing and the like to be described later. Reference numeral 3003 is a memory, which has a program memory 3003a storing a control program of the CPU of the DSP 3002; a RAM area storing a program at the executing time; and a memory area to function as a work memory storing the image data and the like.

Reference numeral 3004 denotes a printer engine. Here, a printer engine of an ink jet printer for printing a color image by using color inks of plural colors is mounted. Reference numeral 3005 denotes a USB bus connector, which functions as a port to connect a digital camera 3012. Reference numeral 3006 denotes a connector for connecting the viewer 1011.

Reference numeral 3008 denotes a USB bus hub (USB HUB), which lets through a data from the PC 3010 as it is when the printer apparatus 1000 performs printing based on the image data from the PC 3010, and outputs the data to the printer engine 3004 through the USB bus 3021.

This allows the connected PC 3010 to exchange the data and signals directly with the printer engine 3004 so as to be able to execute the printing (to function as an ordinary PC printer). Reference numeral 3009 denotes a power connector, which receives a direct voltage converted from a commercial AC by using a power 3013. The PC 3010 is an ordinary personal computer, and reference numeral 3011 denotes the above described memory card (PC card) and reference numeral 3012 a digital camera.

The exchange of signals between the control portion 3000 and the printer engine 3004 is performed through the above described USB bus 3021 or an IEEE 1284 bus 3022.

Figure 4:
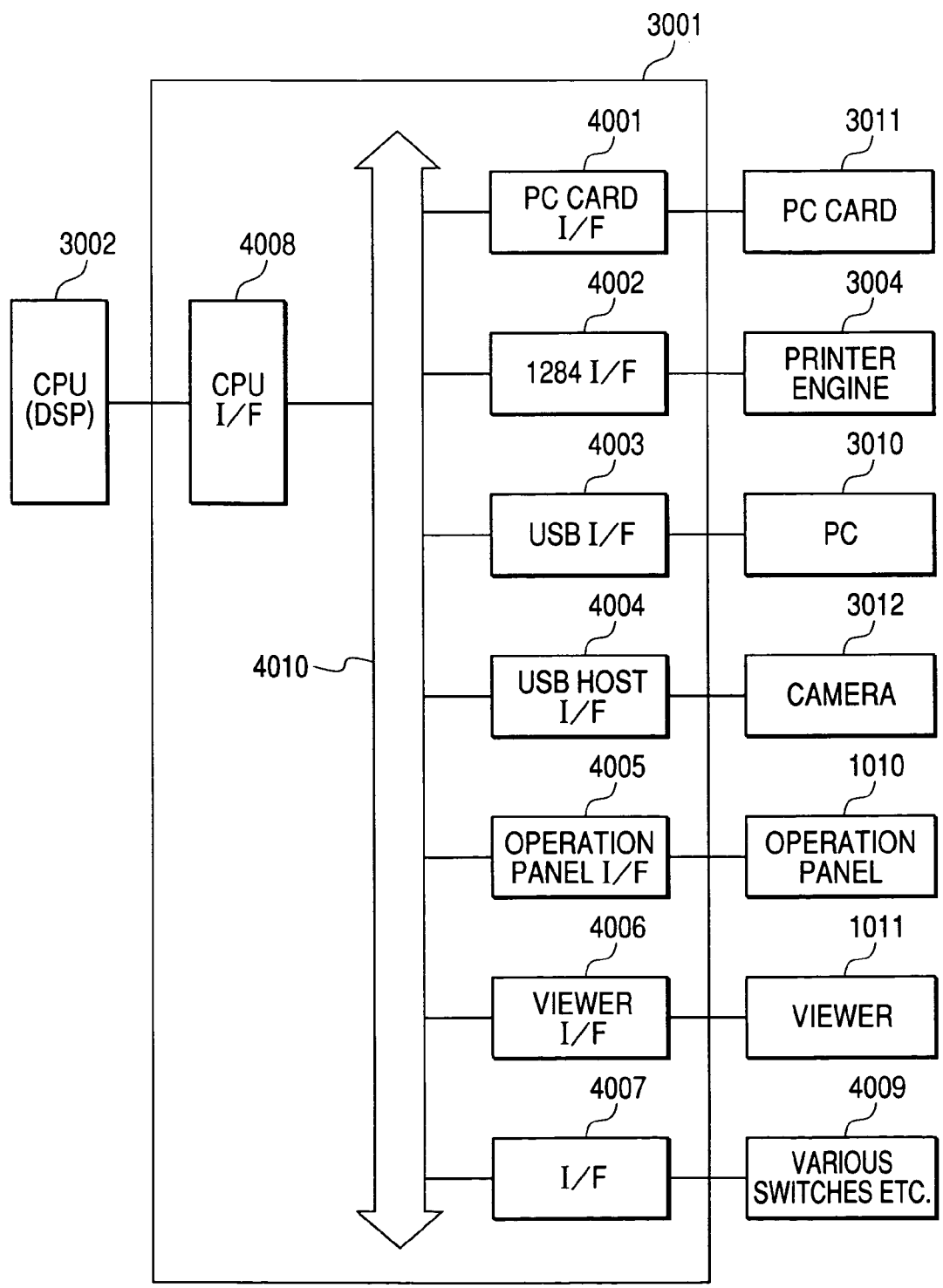
FIG. 4 is a block diagram showing the detailed configuration of an ASIC shown in FIG. 3.

FIG. 4 is a block diagram showing the detailed configuration of the ASIC 3001 shown in FIG. 3, and the same reference numerals are attached to the same components as FIG. 3.

In FIG. 4, reference numeral 4001 denotes a PC card interface portion, which reads the image data stored in the installed PC card 3011 or writes the data to the PC card 3011 and the like.

Reference numeral 4002 denotes an IEEE 1284 interface portion, which exchanges the data with the printer engine 3004. The IEEE 1284 interface portion is a bus used when the image data stored in the digital camera 3012 or the PC card 3011 is printed. Reference numeral 4003 denotes an USB interface portion, which exchanges the data with the PC 3010. Reference numeral 4004 denotes an USB host interface portion, which exchanges the data with the digital camera 3012.

Reference numeral 4005 denotes an operation panel interface portion, which receives various operation signals from the operation panel 1010 and outputs display data to the display portion 1006. Reference numeral 4006 denotes a viewer interface portion, which controls the display of the image data to the viewer 1011.

Reference numeral 4007 denotes an interface portion to control the interface with various switches, a LED 4009 and the like. Reference numeral 4008 denotes a CPU interface portion, which exchanges and controls the data with the DSP 3002. Reference numeral 4010 denotes an internal bus (ASIC bus), which connects each of these portions.

Figure 5:
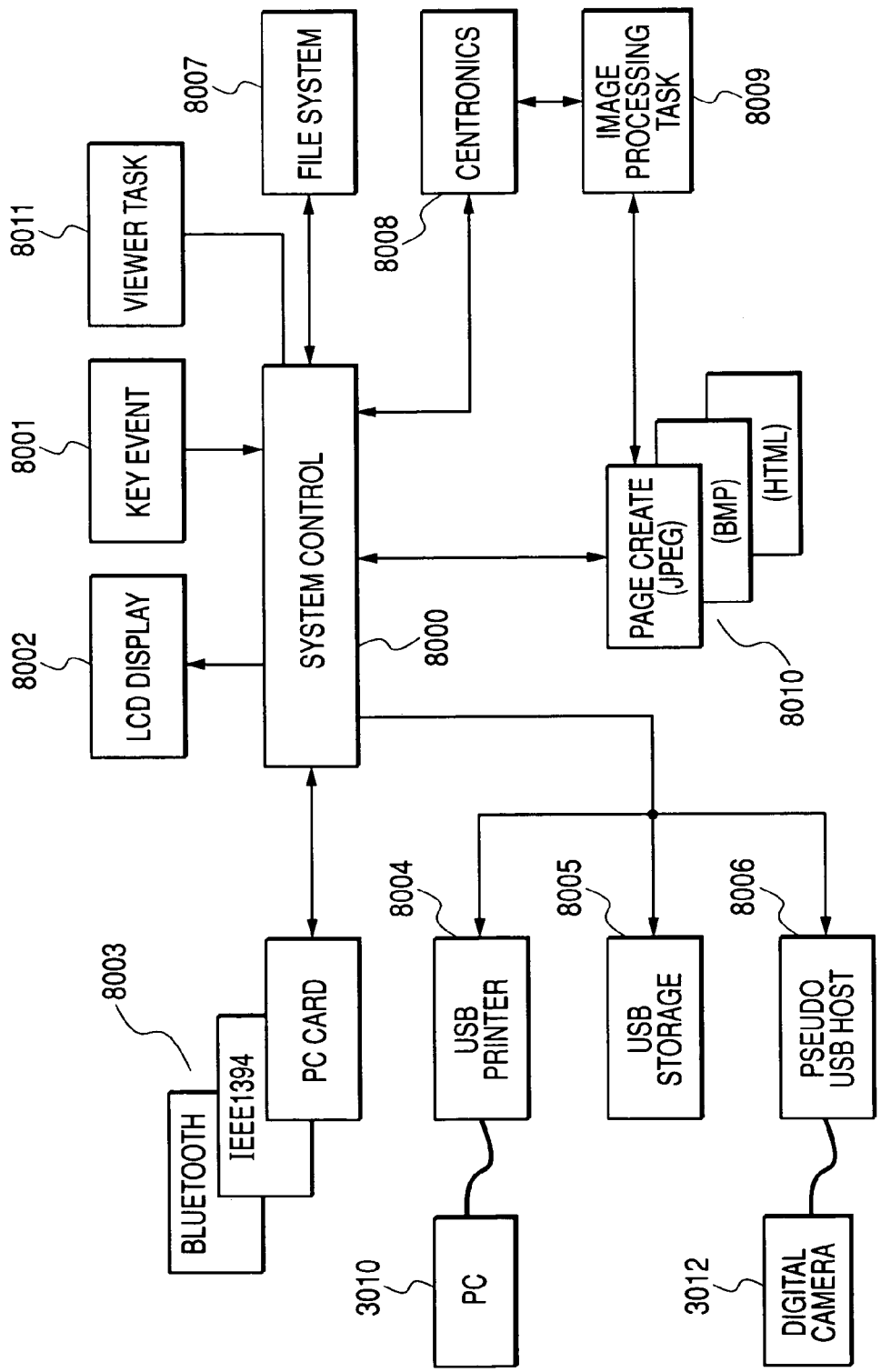
FIG. 5 is a block diagram to explain a correspondence between each device and functional module in the image processing apparatus shown in FIG. 4.

These control programs are configured by a multi-task format which is task-oriented for every functional module, and the main task configuration thereof is as shown in FIG. 5.

FIG. 5 is a block diagram to explain the correspondence between each device and the functional module in the image processing apparatus shown in FIG. 4.

In FIG. 5, reference numeral 8000 denotes a system control task, which performs the adjustment of the whole system such as the issuance of an event between respective tasks, a sequence control and exclusion processing accompanied with the completion of the event and the like.

Reference numeral 8001 denotes a key event task, which performs an analysis and the like of the pressed key based on the key operation of the operation panel 1010. Reference numeral 8002 denotes a display task for the LCD display portion 1006, which executes a UI control in the display portion 1006 or a display control for the display portion 1006 which is activated when an request for message display and the like is generated.

Reference numeral 8003 denotes a task, which is activated by the input and output of the data by writing to the PC card 3011 or by an IEEE 1394 or Bluetooth or the like. Reference numeral 8004 denotes a USB printer task activated by a data transfer from the PC 3010 connected through the USB bus, which is activated by a printer interrupt of the USB and executes a function as the PC printer.

Reference numeral 8005 denotes a USB storage, which is activated by the system control task 8000 and performs the initialization of a firmware. It also performs the activation and termination of the USB control task and the USB bus task, both of which are lower tasks, according to the message from the system control task 8000.

Reference numeral 8006 denotes a pseudo USB host, which is activated by the USB task, and reads the data from the digital camera 3012 connected through the USB and executes various communication controls, and the like. Reference numeral 8007 denotes a file task, which performs an I/O control for opening, closing, reading, and writing and the like of files. Reference numeral 8008 denotes a centronics task, which is activated from a centronics interface connected to the printer engine 3004 and executes a DMA transmission of the print data, a status response and the like.

Reference numeral 8009 denotes an image processing task, which executes the image processing to be described later, and prepares a raster data to be outputted to the printer engine 3004. Reference numeral 8010 denotes a page create task, which extends and converts the JPEG data into the image data. Reference numeral 8011 denotes a viewer task, which executes a display control for the viewer 1011 that is in a connected state.

Figure 6:
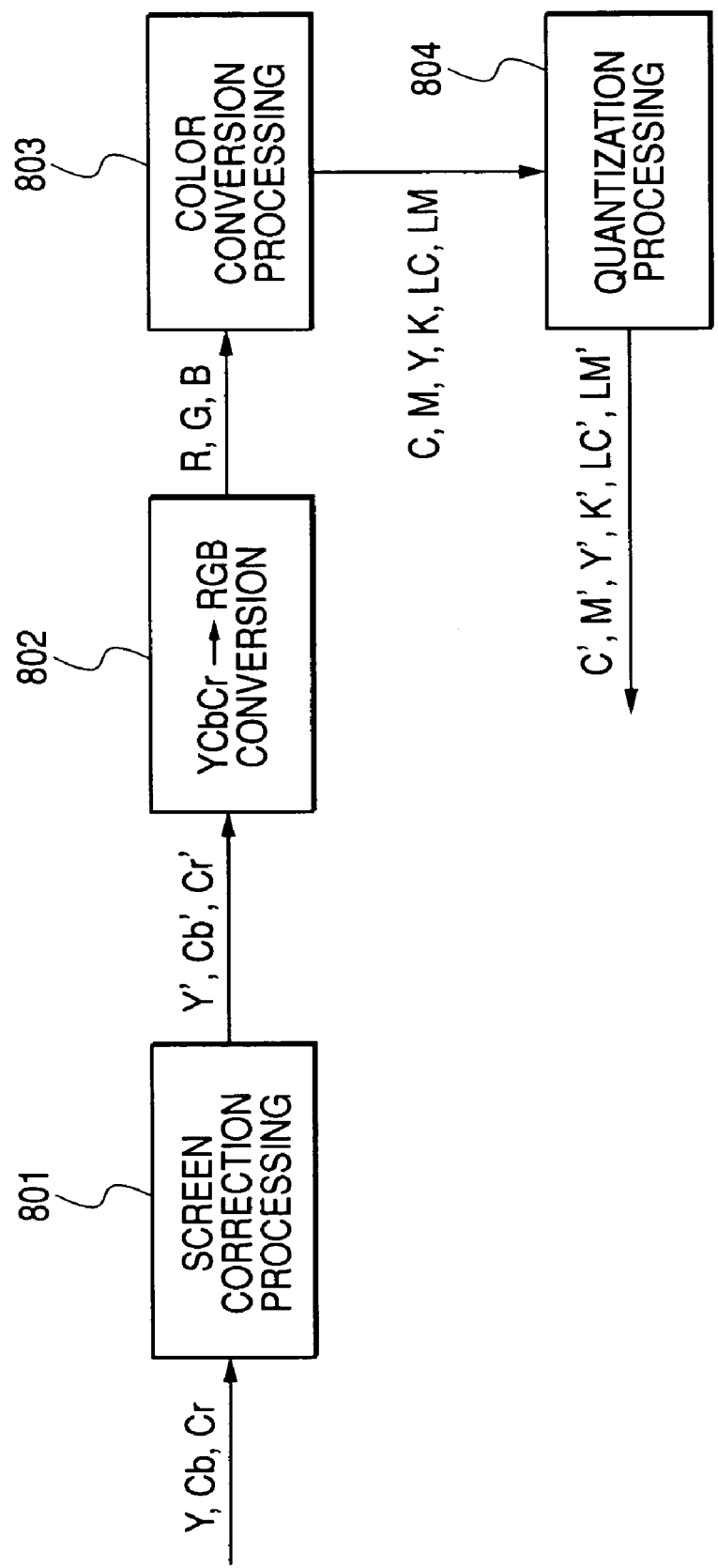
FIG. 6 is a block diagram to explain a functional processing of the image processing task shown in FIG. 5.

FIG. 6 is a block diagram to explain a functional processing of the image processing task 8009 shown in FIG. 5.

In the page create task 8010 shown in FIG. 5, the image data of the YCbCr format subjected to the decoding processing is, first, subjected to the image correction processing 801 in FIG. 6. While the detail of the image correction processing 801 will be described later, this allows to obtain the data of Y', Cb' and Cr' subjected to the correction processing. The data of Y', Cb' and Cr' is, then, subjected to Y, Cb, Cr to RGB conversion 802. The conversion from Y, Cb and Cr to RGB is performed by the following formula in accordance with ITU-R BT.601.

$R = Y + 1.402 (Cr-128)$ $G = Y - 0.34414 (Cb-128) - 0.71414 (Cr-128)$ $B = Y + 1.772 (Cb-128)$ provided that YCbCr is 8 bit and is taken as 0 to 255. After that, the image data converted into the RGB format is converted into ink colors, which are six kinds of ink colors such as C, M, Y, K, LC and LM in the present embodiment, by the color conversion processing 803. As for the conversion method, there are several methods available, but here, the method using a look up table (hereinafter, referred to as LUT) and an interpolation processing is taken as an example.

FIG. 7 is a diagram showing one example of the LUT, to which the color conversion processing 803 shown in FIG. 6 refers.

In the LUT prepared in advance, there are described C, M, Y, K, LC and LM signal values corresponding to 4913 points wherein RGB values as shown in FIG. 7 are divided into 16 for each 16 level, and reference is made to C, M, Y, K, LC and LM values corresponding to the values of the input RGB. In case the RGB values are located in the gaps divided into 16, R'G'B' values are found by the interpolation processing.

Hereinafter, a tetrahedron interpolation method will be taken as an example of the interpolation method with reference to FIGS. 8A and 8B.

Figure 8A:
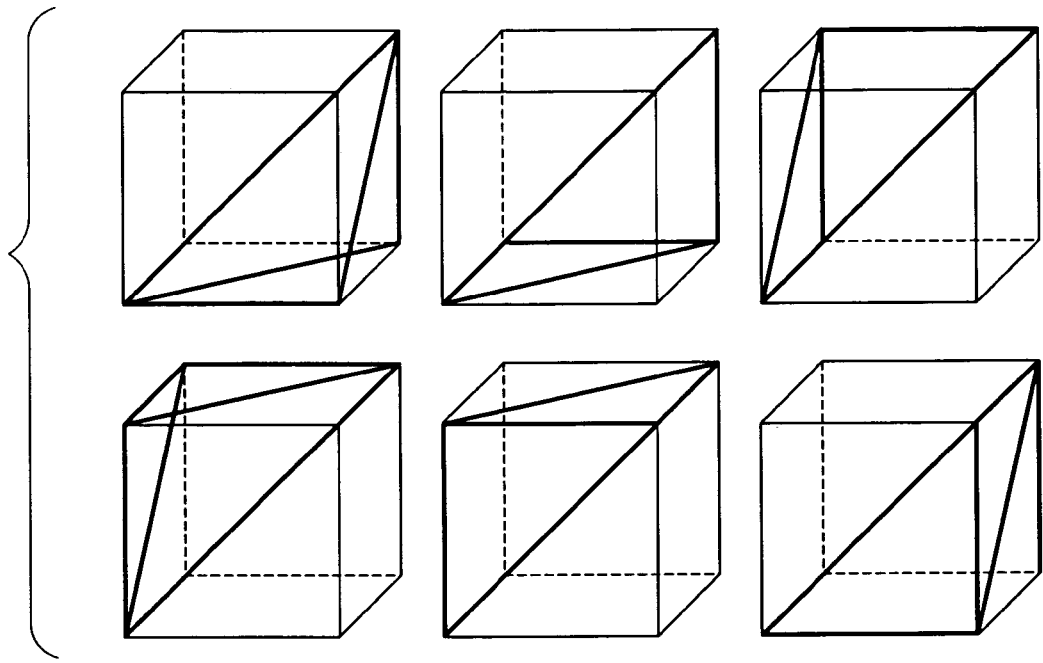
FIGS. 8A and 8B are diagrams to explain a concept of a tetrahedron interpolation in the color conversion processing shown in FIG. 6.
Figure 8B:
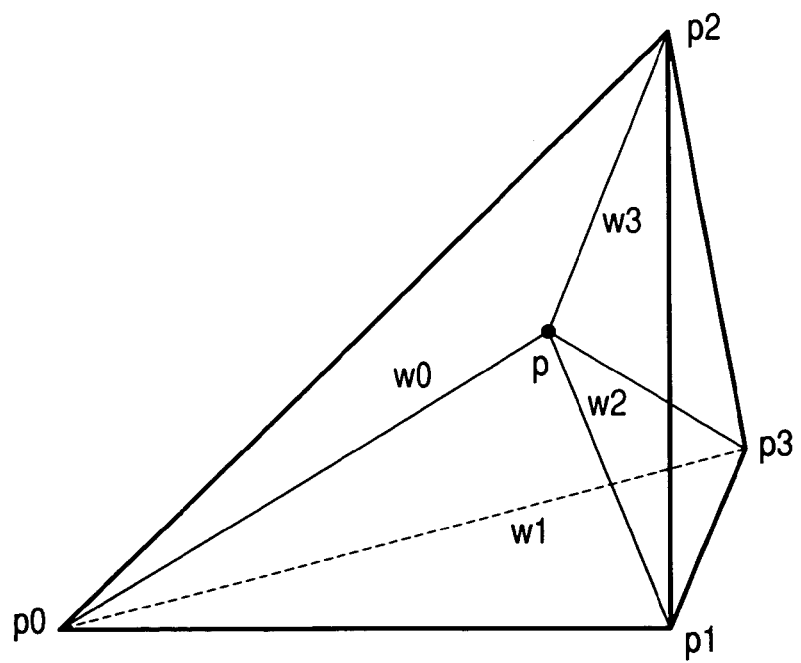

FIGS. 8A and 8B are diagrams to explain the concept of the tetrahedron interpolation method in the color conversion processing 803 shown in FIG. 6.

The tetrahedron interpolation method is a linear interpolation using four lattice points with a divisional unit of the three dimensional space taken as a tetrahedron.

As its procedure, first, a division of the three dimensional space into the tetrahedron is performed as shown in FIG. 8A, and it is determined as to which divided tetrahedron a target point P belongs. Four vertices of the tetrahedron are taken as p0, p1, p2 and p3, and as shown in FIG. 8B, the tetrahedron is further divided into minute small tetrahedrons. In addition, presuming that the conversion values of expansion points are taken as f (p0), f (p1), f (p2) and f (p3), respectively, they are found by the following equation:

$$f(p) = \sum_{i=0}^{3} wi \times f(pi) = [w0, w1, w2, w3] \begin{bmatrix} f(p0) \\ f(p1) \\ f(p2) \\ f(p3) \end{bmatrix}$$

Here, w0, w1, w2 and w3 are volume ratios of the small tetrahedrons positioned in opposite to each vertex pi. This allows the data to be converted into the ink colors C, M, Y, K, LC and LM.

Here, referring back to FIG. 6, the data converted into the ink colors by the color conversion processing 803 is subsequently subjected to a quantization processing 804. This processing converts multi-bit data into the number of bits smaller than that recordable by a recording apparatus.

In the present embodiment, a case of the ink jet printer which is one bit binary of recording (1)/non-recording (0) is considered. Here, a quantization method is taken as an error diffusion method which is best-suited for the quantization of a photographic image. Further, the input signal is taken as 0 to 255 of eight bits.

Figure 9:
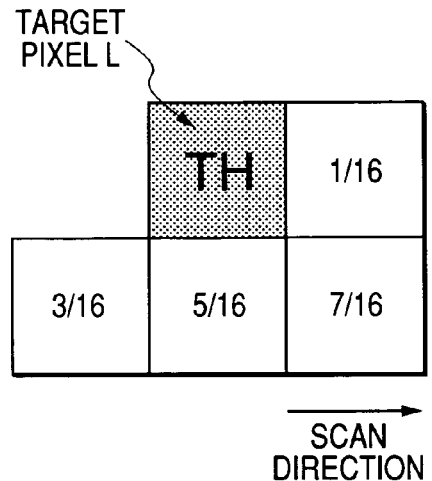
FIG. 9 is a diagram showing an error distribution method in an error diffusion method in the image processing apparatus according to the present invention.

FIG. 9 is a diagram showing an error distribution method in an error diffusion method in the image processing apparatus according to one embodiment of the present invention. When the signal value of the target pixel is taken as L ($0 \leq L \leq 255$), its comparison to a threshold value TH is performed. Depending on its size., the signal value is determined as follows.

L>TH . . . 1 (recording)

L≦TH . . . 0 (non-recording)

The error E (=L−TH) generated at that time is distributed to the surrounding pixels according to the distribution coefficient of FIG. 9. This processing is performed to all the pixels and all the ink colors C, M, Y, K, LC and LM, so that they are quantizied into one bit image data colors C', M, Y, K', LC' and LM'.

Next, the image correction processing to perform the usage of the memory, which becomes features of the present embodiment, will be described in detail with reference to the flowchart of FIG. 10.

Figure 10:
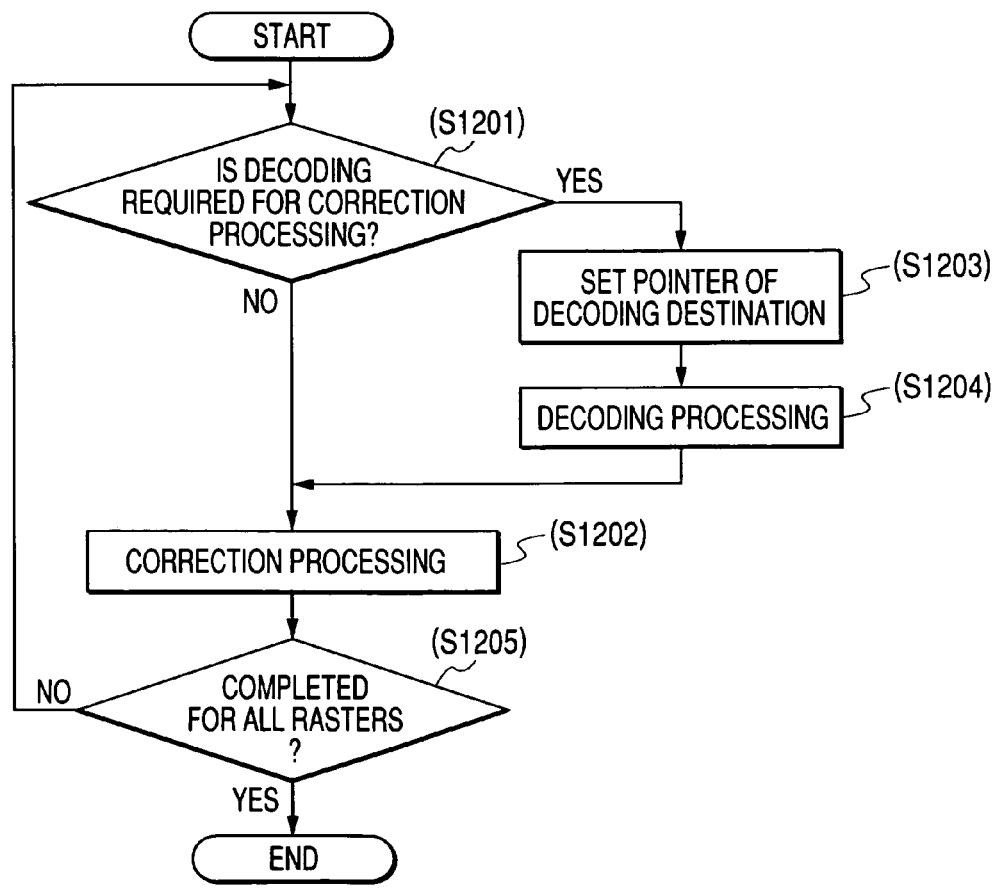
FIG. 10 is a flowchart showing one example of a first data processing procedure in the image processing apparatus according to the present invention.

FIG. 10 is the flowchart showing one example of a first data processing procedure in the image processing apparatus according to one embodiment of the present invention, which corresponds to the correction processing procedure of a raster unit. Reference numerals S1201 to S1205 denote respective steps. This step corresponds to the image processing task 8009, and further, in order to execute the correction processing for each raster, a new one line is required from the correction processing previously performed.

First, in step S1201, in order to obtain the new one line, it is determined whether or not decoding is required. Here, if it is determined that decoding is not required, the procedure advances to step S1202, and the correction processing is executed.

On the other hand, if it is determined that decoding is required in step S1201, an output destination address to output the decoding data is set up in step S1203, and the decoding processing is executed in step S1204. After that, the procedure advances to step S1202, and the correction processing is performed.

After the correction processing is executed, in step S1205, it is determined whether or not the processing has been executed on the whole raster, and if it is determined that processing has been executed, the processing is completed, and if it is determined that the processing is not yet executed, the raster of interest is decided, and the procedure returns to step S1201.

Next, specific contents of the correction processing will be described.

In the first embodiment, a removal processing of low frequency noises caused by CCD of the digital camera 3012 will be taken up.

Figure 11:
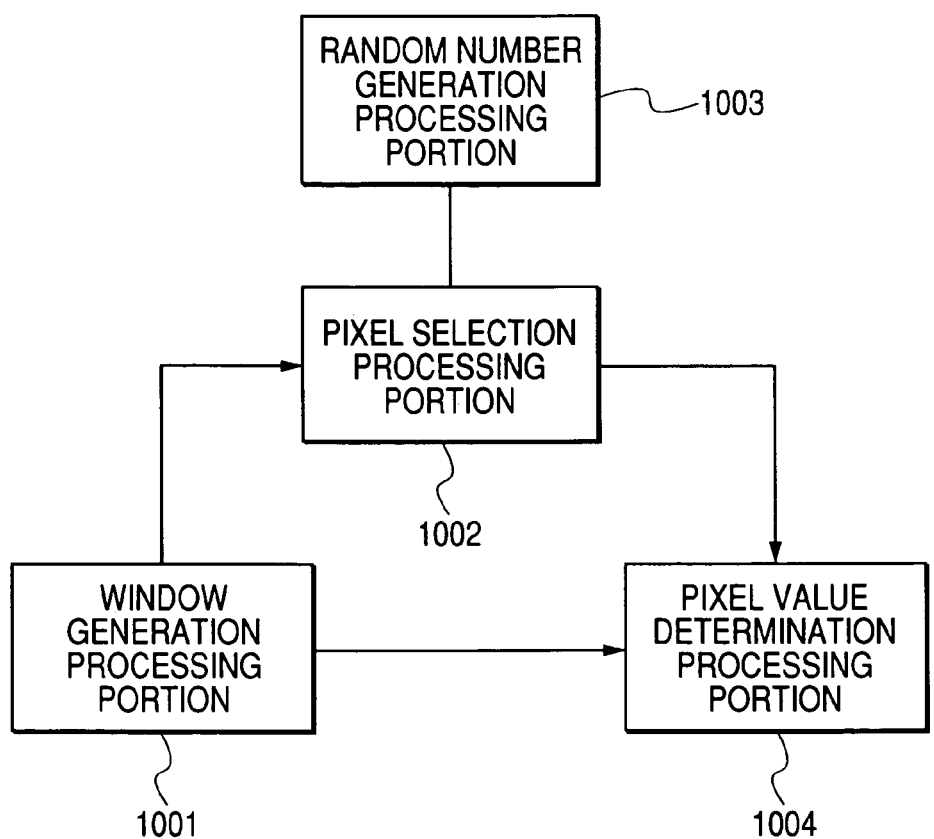
FIG. 11 is a block diagram to explain a noise removal processing function in the image processing apparatus according to the present invention.

FIG. 11 is a block diagram to explain a noise removal processing function in the image processing apparatus according to the first embodiment of the present invention, which is one example of the image processing task 8009 shown in FIG. 5.

In FIG. 11, a window generating processing portion 1001 generates a window to perform the noise removal processing. In the present embodiment, the window size is taken as 9×9 pixels.

In a pixel selection processing portion 1002, pixels in the interior of the window are randomly selected from random numbers generated in the random number generation processing portion 1003. In a pixel value determination processing portion 1004, the pixel value of the target pixel is determined by comparison to the threshold value.

Figure 12:
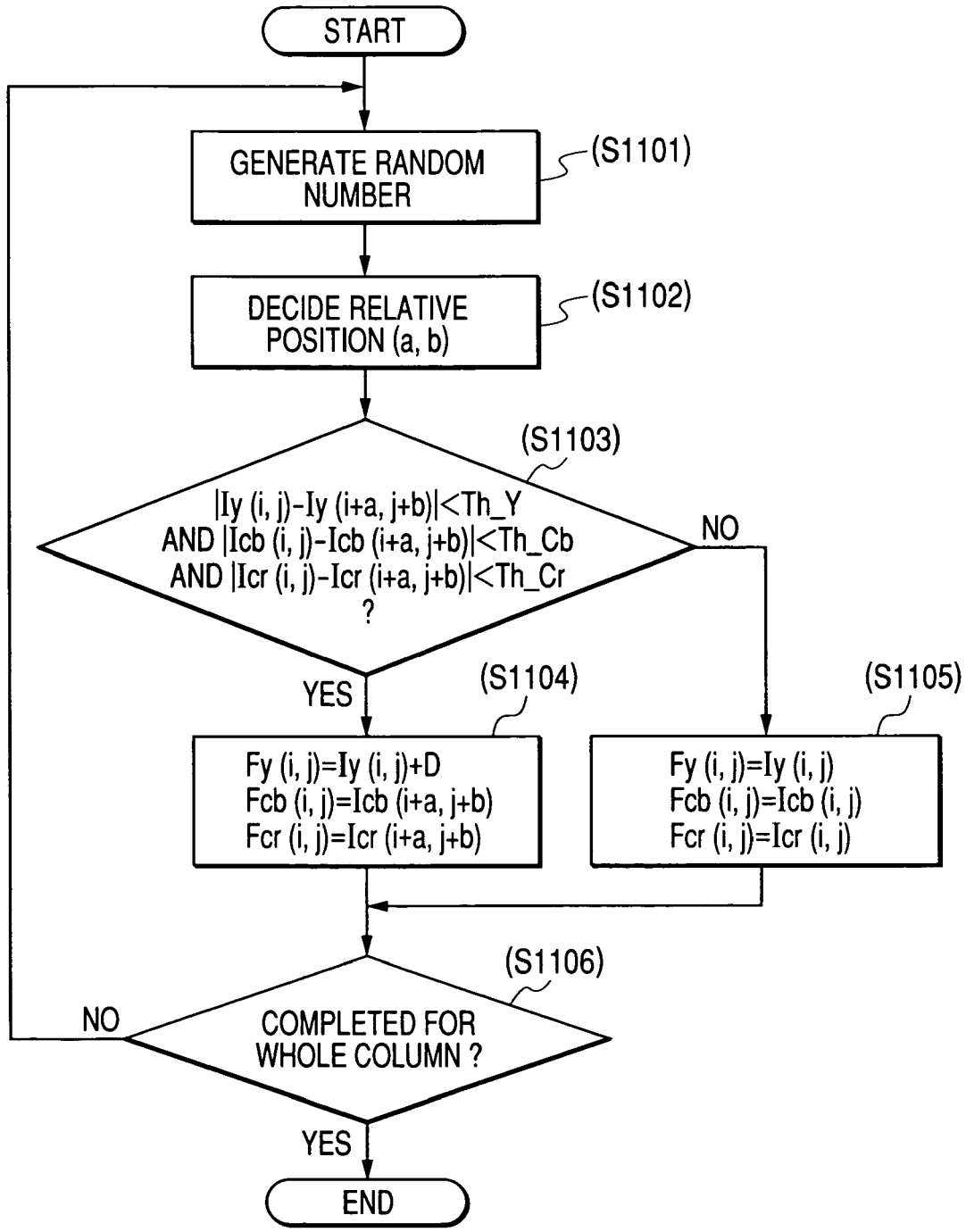
FIG. 12 is a flowchart showing one example of a second data processing procedure in the image processing apparatus according to the present invention.

FIG. 12 is a flowchart showing one example of a second data processing procedure in the image processing apparatus according to one embodiment of the present invention, which corresponds to the noise removal processing procedure in some raster (y). Reference numerals S1101 to S1106 denote respective steps.

First, in step S1101, two random numbers are generated by the random number generation processing portion 1003. Note that the generation algorism of the random number is not limited here, but it is desired probabilistically to be uniform.

Next, in step S1102, positional information not exceeding the window size is generated from the generated random number. For example, in the case where the widow size is 9×9, if the pixel of interest is taken as a center, the positional information is set by using a surplus calculation from the generated random number, so that $-4 <= a <= 4$ $-4 <= b <= 4$ are established.

Next, in step S1103, by using the determined values of a and b, a comparison based on the following first (1) formula is performed.

$$|IY(i,j)-IY(i+a,j+b)|<Th\_Y, \text{ and moreover}$$

$$|Icb(i,j)-Icb(i+a,j+b)|<Th\_Cb, \text{ and Moreover}$$

$$|ICr(i,j)-ICr(i+a,j+b)|<Th\_Cr \quad (1)$$

Here, IY(i, j), ICb(i, j) and ICr(i, j) represent a x column of the image, a luminance Y of the y raster position, a color difference Cb, and a color difference Cr component.

Further, TH_Y, TH_Cb and TH_Cr are the threshold value to determine a finite difference with the target pixel (i+a, j+b), which is to be set in advance. The more this threshold value becomes large, the more the strength of the noise removal becomes increased.

When it is determined that the condition of step S1103 is satisfied, the procedure advances to step S1104, and the output pixel values FY(i, j), FCb(i, j) and FCr(i, j) become as follows from the following second (2) formula:

$$FY(i,j)=IY(i,j)+D$$

$$FCb(i,j)=ICb(i+a,j+b)$$

$$FCr(i,j)=ICr(i+a,j+b) \quad (2)$$

Here, a luminance component is not replaced with the luminance of the target pixel, but it adds a fixed value D to the luminance value of the pixel of interest. This is because a sensitivity of the eye is high for the luminance component and it is better not to change the value sharply so that the effect of the noise removal is enhanced.

On the other hand, in the case where it is determined that the condition of step S1103 is not satisfied, the procedure advances to step S1105, and $$FY(i,j)=IY(i,j)$$

$$FCb(i,j)=ICb(i,j)$$

$$FCr(i,j)=ICr(i,j)$$

are established. That is, there is no change made from the value of the pixel of interest.

In step S1106, it is determined whether or not these processings have been performed on all the pixels, and if it is determined that not completed, i =i+1 is established, and the procedure returns to step S1101, and the above described processings are repeatedly performed.

On the other hand, in step S1106, if it is determined that these processings have been executed on all the columns, the processings are taken as completed for this raster (j).

By subjecting all the rasters to the above described processings, the image data Y'Cb'Cr'subjected to the noise removal processing can be obtained.

Figure 13:
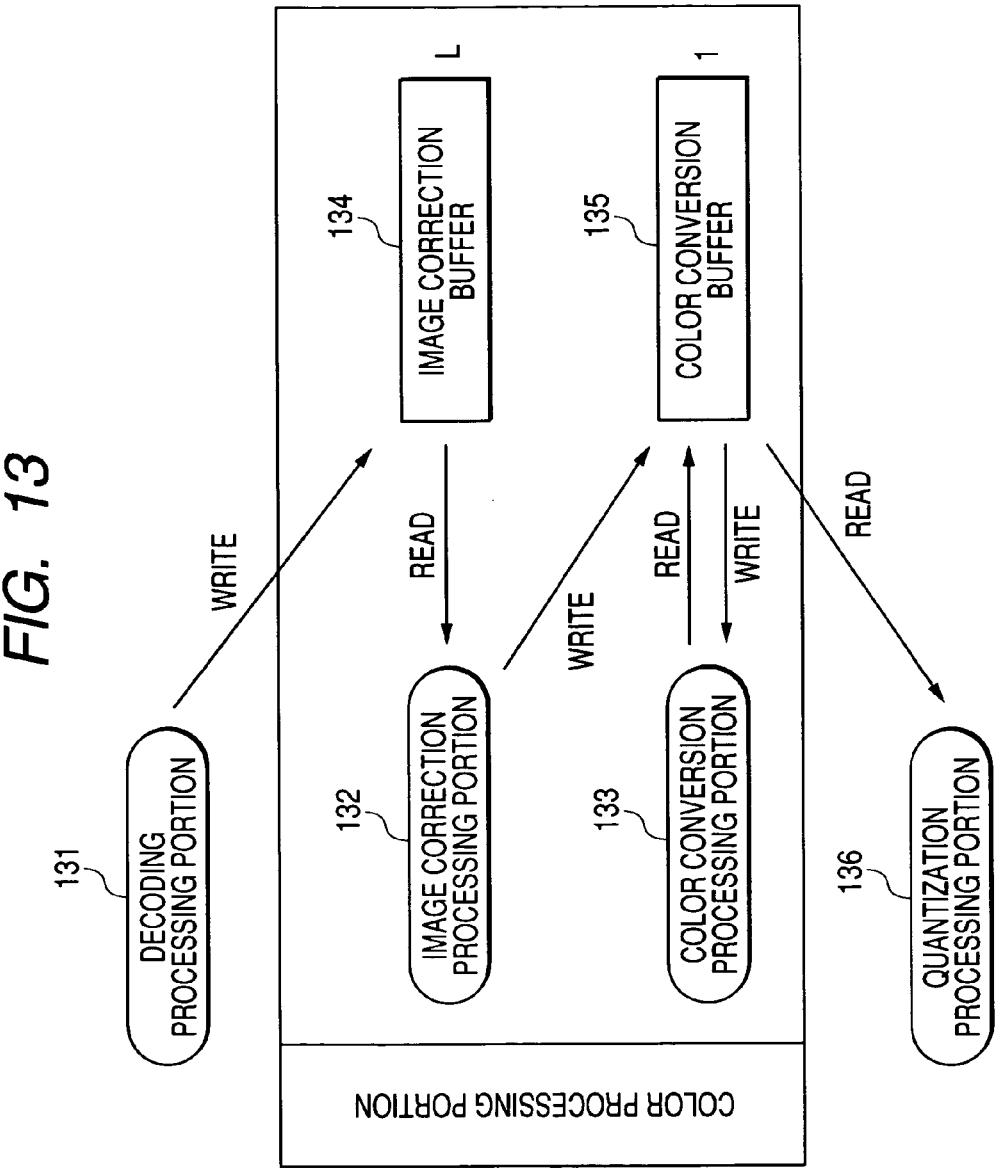
FIG. 13 is a block diagram to explain a functional processing model of a color processing portion in the image processing apparatus according to the present invention.

FIG. 13 is a block diagram to explain a functional processing model of a color processing portion in the image processing apparatus according to one embodiment of the present invention, which corresponds to a model showing the usage of a buffer up to the noise removal and the color conversion processing from the JPEG decoding of the present embodiment.

In FIG. 13, reference numeral 132 denotes an image correction processing portion, which, when it is determined that the decoding is required, sets up a storing destination address of the decoding data of an image correction buffer 134, and submits a decoding request to a decoding processing portion 131. The decoding processing portion 131 receiving the decoding request executes the decoding processing, and writes decoding data on the set up address. When the number of lines prepared in one decoding time is taken as N, and the number of lines required for the image correction processing is taken as M, the number of lines L of the image correction buffer 134 can be found as follows:

$$L=M+(N-1) \quad (3)$$

The L which can be found by the above equation is applied for the case where the memory is reduced to the least, and it is naturally possible to make it larger than this value.

In the case of the present embodiment, since the number of lines N prepared in one decoding time is taken as eight, and the number of lines M required for the image correction processing is taken as nine, the number of lines L of the image correction buffer 134 becomes 9+(8−1)=16.

After the required data is gathered, the image correction processing portion 132 executes the correction processing, and writes the result on a color conversion buffer 135. A color conversion processing portion 133 performs a color conversion processing for the data in the color conversion buffer 135, and the processing is completed after overwriting.

Hereinafter, the image correction buffer 134 shown in FIG. 13 will be described in detail.

Figure 14:
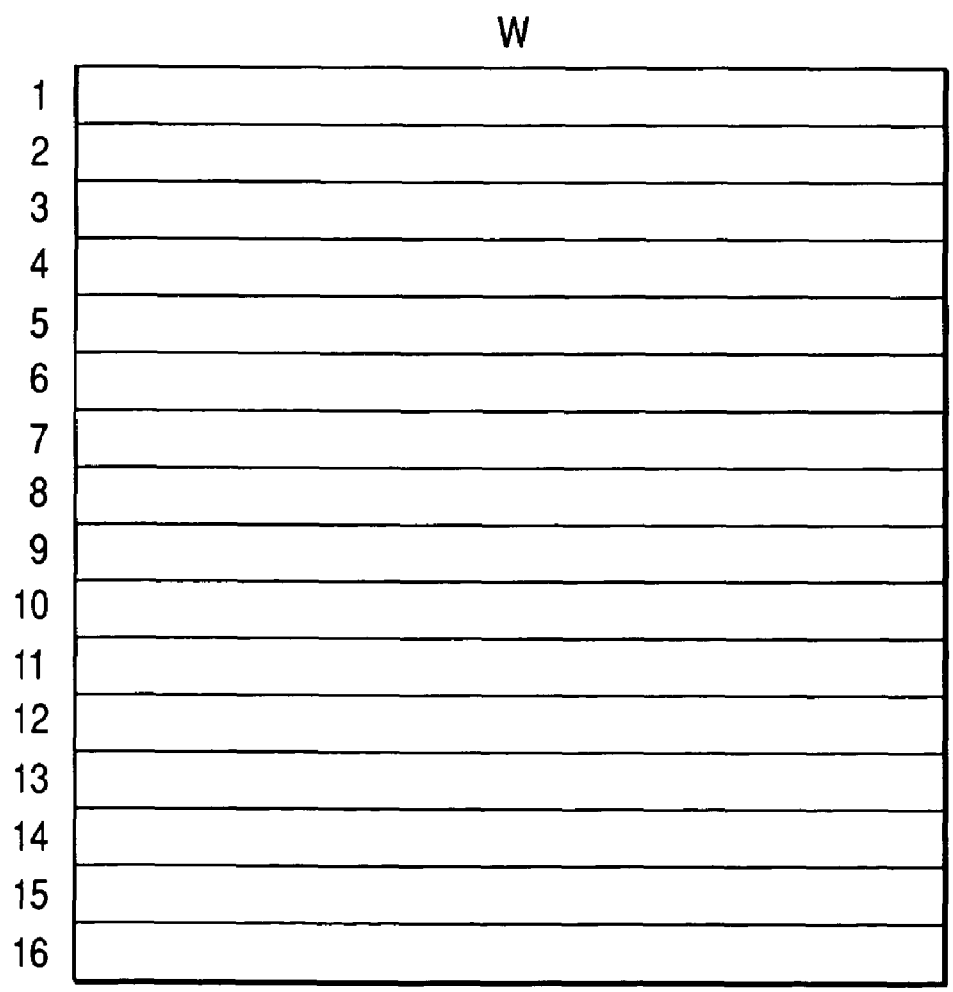
FIG. 14 is a diagram to explain the detailed configuration of an image correction buffer shown in FIG. 13.

FIG. 14 is a diagram to explain the detailed configuration of the image correction buffer 134 shown in FIG. 13. As for the buffer size, there are sixteen rasters available in a raster direction as described above, and a column direction (width) is taken as W.

Note that W depends on the corresponding image size, and if the image is taken by the digital camera which can take a digital image of so-called two mega pixels having 1600 pixels in width and 1200 pixels in length, the number of pixels for W becomes 1600. Moreover, since the data of three components of Y, Cb and Cr is stored for each pixel, the number of pixels for W is as follows: W=1600×3=4800. As for a memory capacity, presuming that each component is made of eight bits, 16×4800=76800 [Byte] is required.

Next, the usage of the memory during processing will be described with reference to FIGS. 15A to 15E.

FIGS. 15A to 15E are diagrams to explain the usage example of the image correction buffer 134 shown in FIG. 14.

Figure 15A:
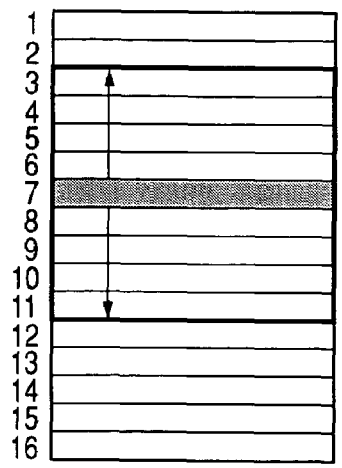
FIGS. 15A, 15B, 15C, 15D and 15E are diagrams to explain an example of how to use the image correction buffer shown in FIG. 14.
Figure 15B:
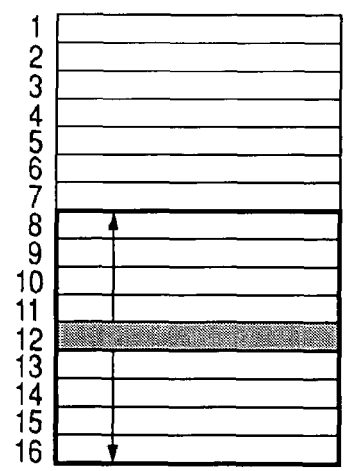
Figure 15C:
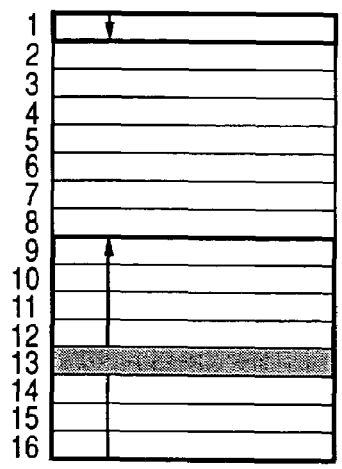

FIG. 15A shows the processing of the seventh line under execution. Four lines each above and below from the seventh line, that is, the third line to the eleventh line are taken as a window, and noise removal processing is performed, and writing is performed sequentially to the color conversion buffer 135. When the processing is completed for all the pixels of the seventh line, a target line is moved to the eighth line. The processing is repeatedly performed in this manner, and in FIG. 15B is shown a state of the target line moved to the twelfth line.

In this case, the window is defined from the eighth to the sixteenth lines. After the noise removal processing is completed for the twelfth line and moves to the thirteenth line (FIG. 15C), the scope of the window has the target line upper portion defined by four lines from the ninth to the twelfth line and the target line lower portion defined by three lines from the fourteenth to the sixteenth and one line of the first line. In this case, since what is stored in the first line is the raster data previously finished with the processing, new decoding is required. The address of the decoding destination is taken as the head address of the first line, and a request for decoding is submitted. The decoding is performed in a unit of eight lines, and therefore, newly decoded image data is stored in the area from the first to the eighth line.

Figure 15D:
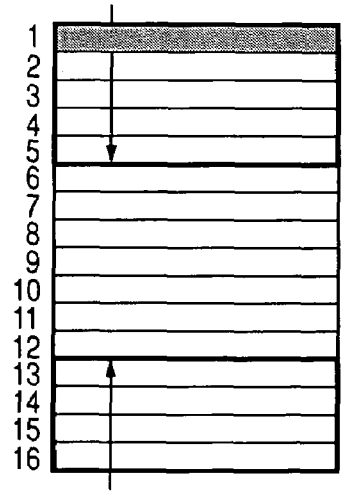
Figure 15E:
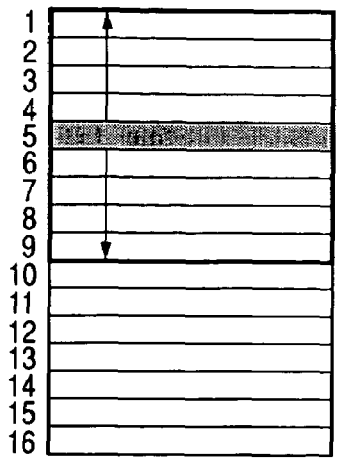

After that, the target line advances to the sixteenth line, and when the processing is completed there, the target line is returned to the first line (FIG. 15D). As shown in FIG. 15E, when the target line advances to the fifth line, the window is defined by the first to the ninth lines, and a new raster data is required for the ninth line. The head address of the ninth line is set to the pointer of the decoding destination, and a request for decoding is issued. The decoding data is stored within the ninth to the sixteenth lines, and the processing is continued.

In this manner, when the executed number of lines is taken as J, the target line R at 0 to L on the buffer is represented as R=J % L. Note that the % in the equation shows a surplus calculation.

The timing of submitting a request for decoding is decided such that, when the number of decodings is taken as D, the number of lines S generated by decoding is decided by the number of lines S=D×N, and the number of lines T required is decided by the number of lines T=J+(M−1)/2, and when the number of lines required exceeds the number of lines generated by decoding, that is, when (T>S) becomes true, a request for decoding is submitted. At this time, the address A of the decoding destination to be set is calculated by A=(S+1)% L.

What is obtained by these calculation processings becomes the head address of the line.

By using this method, while the memory access (writing processing) is conventionally required four times until reaching the quantization processing as described above, the present processing, as evident also from FIG. 13, can be realized by the writing processing performed three times such as: (1) writing of a decoder to the decoding buffer; (2) writing of the raster data to the color conversion buffer after the noise removal processing; (3) overwriting to the color conversion buffer after the color conversion processing and the like.

Further, when the decoding buffer and the image correction buffer are independently maintained as a buffer capacity also as heretofore, while 1600×8×3 (decoding buffer)+1600×9×3 (image correction buffer)=81600 [Bytes] was required, as described above, the image correction buffer becomes 76800 [Bytes], and the memory resources can be saved.

In this manner, by securing the image correction buffer of the number of lines shown by L=M+(N−1) and thus utilizing the usage of a ring buffer, it is possible to reduce the number of accesses to the memory, attempt speeding up of the access, and reduce the required capacity of the memory in the image correction processing.

<Second Embodiment>

As a second embodiment, a gradation processing by using a matrix will be shown as an image correction processing example. The flow of a basic processing is the same as FIGS. 10 and 13.

FIG. 16 is a diagram to explain a matrix configuration used by an image processing apparatus to show a second embodiment of the present invention.

As for the method of the gradation processing, a LPF processing of 3×3 matrix shown in FIG. 16 is used. The pixel data of the target pixel can be found from the average value of the pixel values of the adjacent surrounding eight pixels (A+B+C+D+E+F+G+H)÷8. By performing this processing for all the pixels, the gradation processing can be executed.

FIGS. 17A to 17C are diagrams showing an example memory usage of an image correction buffer by the image processing apparatus according to the second embodiment of the present invention, and show a model diagram in a memory state actually operating.

Presuming that the number of rasters N generated by decoding at one time is eight lines, the number of lines L of the buffer becomes L=3+(8−1)=10 from the above described formula (3).

FIG. 17A shows a case where the processing is started and the processing of the second line is performed. In this state, the decoded raster data is stored between the first to eighth lines. After that, a filtering processing using the above described LPF is executed, and when the processing is performed for all the pixels in the second line, the target line is advanced by one line. This is repeatedly performed, and the case where the target raster reaches the eighth line is shown in FIG. 17B. At this time, S is decided as S=1×8=8, and T is decided as T=8+(3−1)/2=9, and (T>S) becomes true, and therefore, a request for decoding is submitted. The head address A of the decoding storing destination set up at this time can be found as A=(8+1)% 10=9.

However, in this case, since the decoding is performed for eight rasters, it advances till the buffer of 9+8=17, and after the decoding, when performing the writing to the image correction buffer, it ends up causing the break of the memory. Hence, the determination of A+N>L is performed in advance, and if this conditional formula is satisfied, the initial raster data (L−A+1) is set as a condition for the head address of the Ath line, and the remaining raster data A−(L−A+1) is set as a condition for the head address of the first line, and a request for decoding is submitted.

By performing the above described processing, similarly to the first embodiment, the reduction in the number of memory access times and the used capacity of the memory can be realized in the filtering processing also.

Hereinafter, the configuration of a data processing program readable by the image processing apparatus according to the present invention will be described with reference to a memory map shown in FIG. 18.

Figure 18:
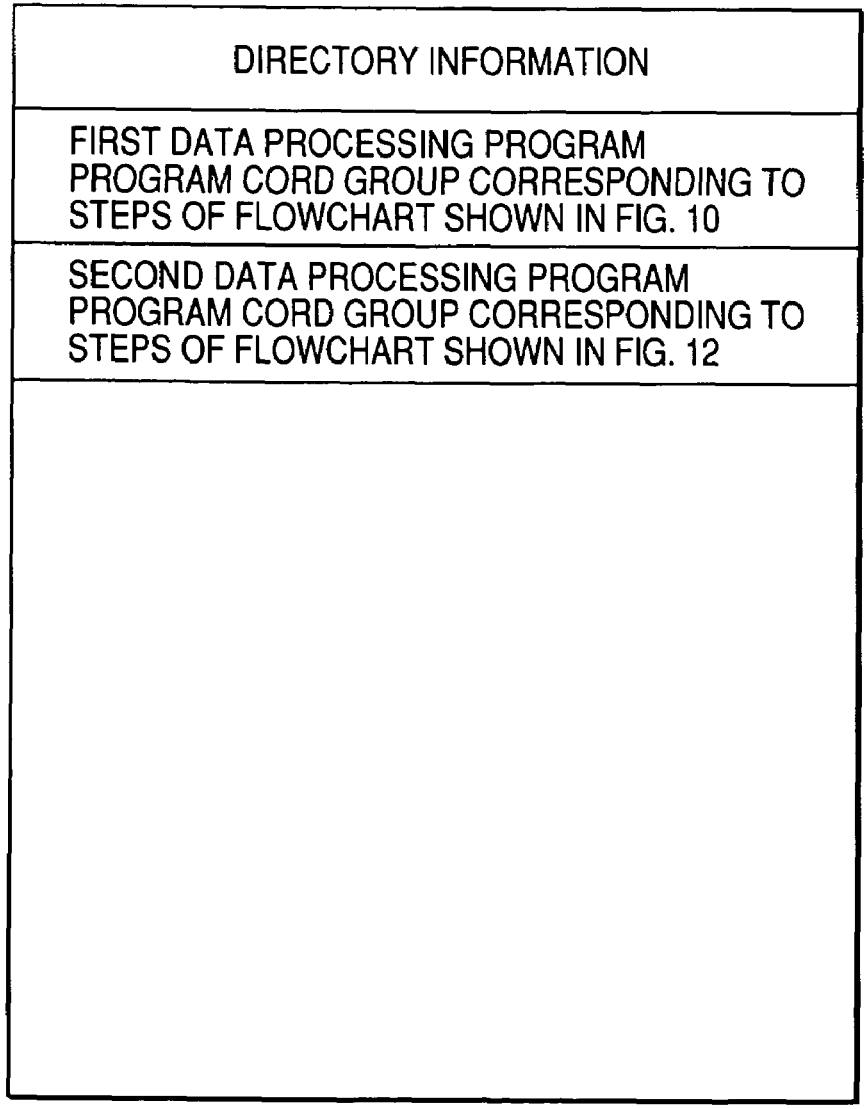
FIG. 18 is a diagram to explain a memory map of a storage medium to store various data processing programs readable by the image processing apparatus according to the present invention.
Figure 19:
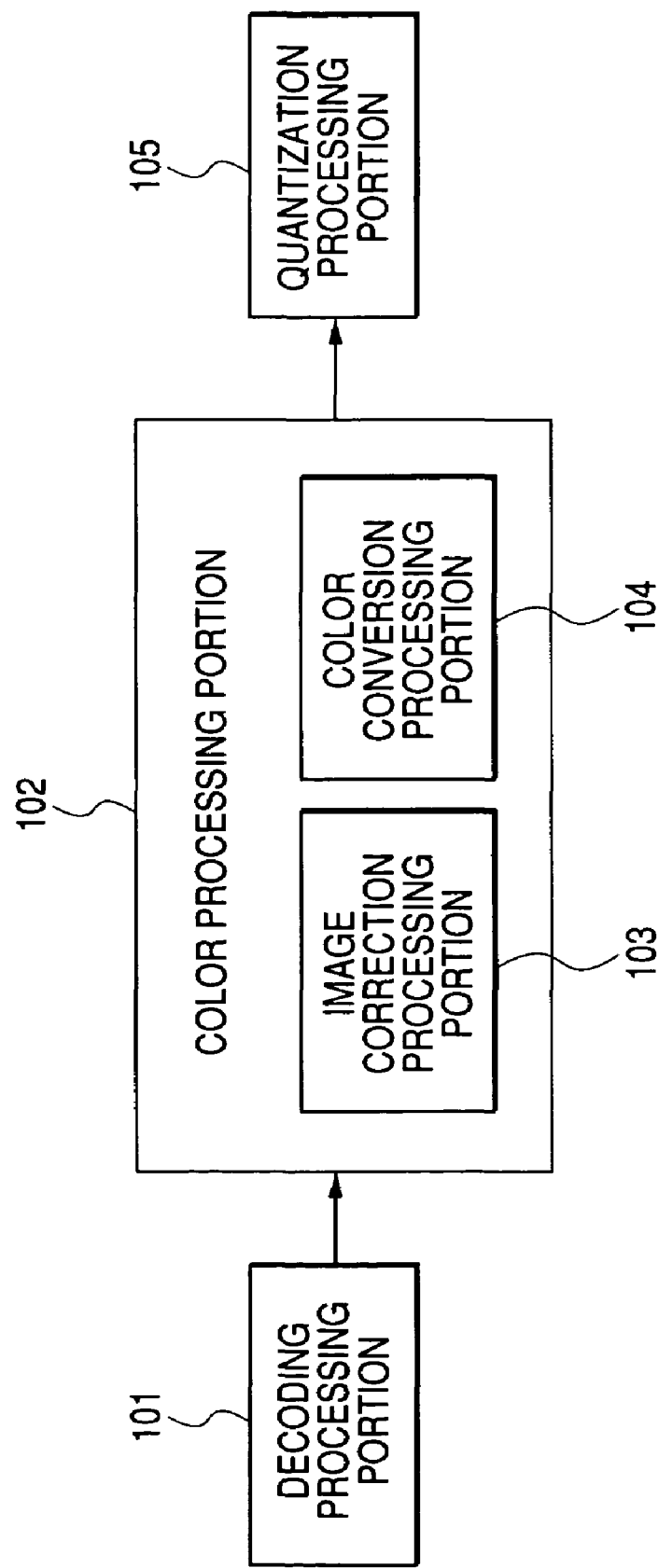
FIG. 19 is a block diagram to explain a data processing state of the conventional image processing apparatus.
Figure 20:
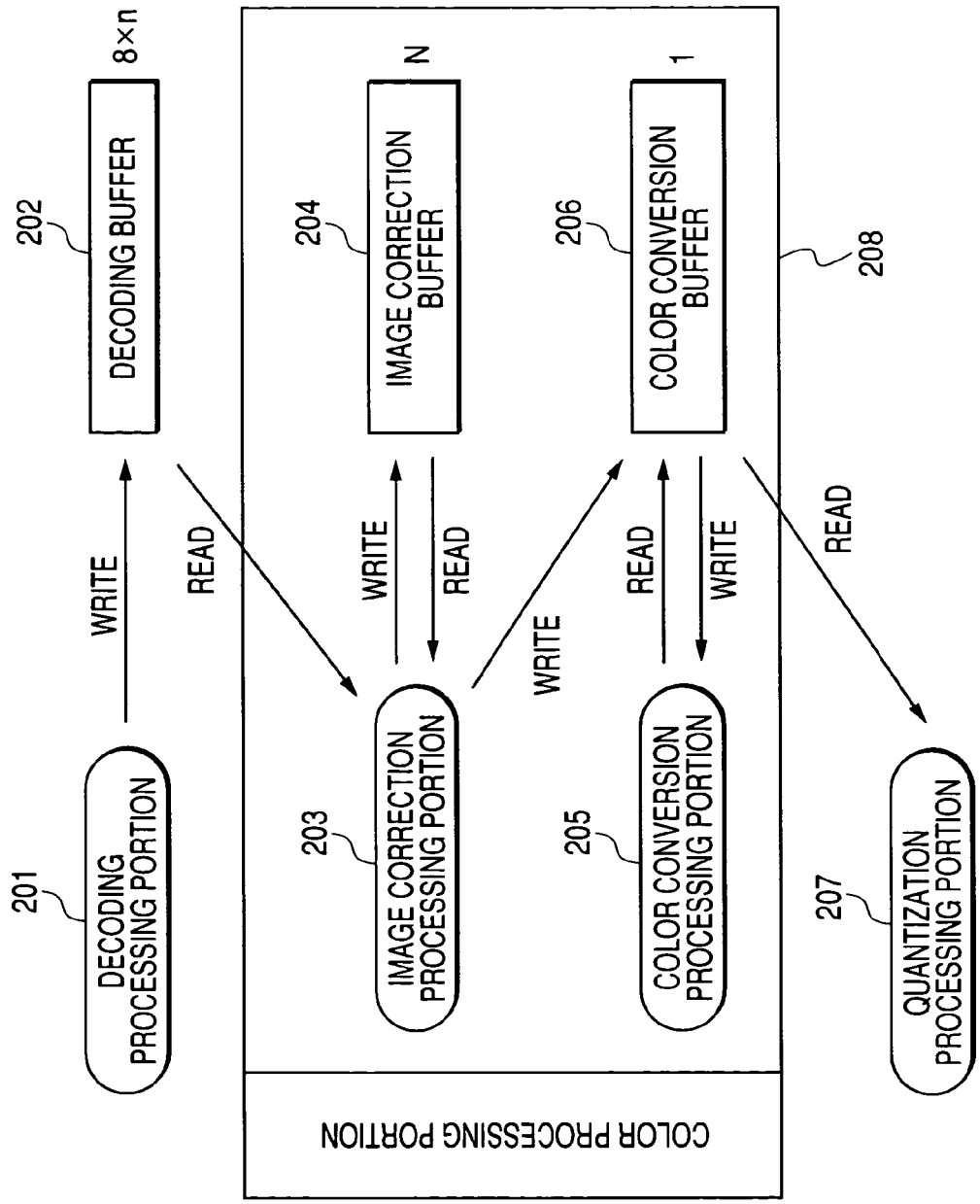
FIG. 20 is a block diagram to explain the detail of the data processing in a color processing portion shown in FIG. 19.

FIG. 18 is a diagram to explain the memory map of a storage medium to store various data processing programs readable by the image processing apparatus according to the present invention.

Although not particularly illustrated, there are often the cases where information for controlling a group of programs stored in the storage medium, for example, version information, and information storing a preparer as well which depends on the OS and the like of the program reading side, for example, an icon to identify the program are stored in this storage medium.

Moreover, the data belonging to various programs is also managed by the above-described directory. Further, a program for installing various program into a computer and a program to unfreeze when a program to be installed is compressed are sometimes stored.

The functions shown in FIGS. 10 and 12 in the present embodiment may be executed by the host computer by the program installed from the outside. In this case, even when a group of information including programs are provided to an output apparatus by the storage medium such as CD-ROM, a flash memory, FD and the like or an external storage medium through a network, the present invention can be applied.

As described above, of course, the storage medium recorded with a program code of the software to realize the functions of the above described embodiment is provided to a system or an apparatus, and the computer (or CPU and MPU) of that system or apparatus reads and executes the program code stored in the storage medium, thereby the object of the present invention is naturally achieved.

In this case, the program code itself which is read from the storage medium realizes unique features of the present invention, and the storage medium to store the program code configures the present invention.

Consequently, there is no objection made to the format of the program if it has a function of the program such as an object code, a program executed by interpreter, a script data provided to OS and the like.

As for the storage medium for providing the program, for example, a flexible disc, a hard disc, an optical disc, a magnetic optical disc, MO, CD-ROM, CD-R, CD-RW, a magnetic tape, a volatile memory card, ROM, DVD and the like can be used.

In this case, the program code itself which is read from the storage medium realizes the functions of the above described embodiment, and the storage medium to store the program code configures the present invention.

In addition to the above, as for the supply method of the program, a Home Page of the Internet is connected by using a browser of a client computer, and from this Home Page, a computer program itself of the present invention or a file compressed and containing an automatic installation function is downloaded to the recoding medium such as a hard disc, thereby supplying the program. Further, the program code configuring the program of the present invention is divided into a plurality of files, and each file is downloaded from a different Home Page, thereby realizing the supply of the program. That is, the method is naturally applicable to a WWW server and a ftp server which allows the program file for realizing the function processing of the present invention by the computer to be downloaded to a plurality of users.

Further, the program of the present invention is ciphered so as to be stored in the storage medium such as CD-ROM and the like, and then, it is distributed to the users, and the users who clear the predetermined condition are allowed to download a piece of key information to decipher the encryption from the Home Page through the Internet and executes the enciphered program by using the key information so as to be installed in the computer, thereby realizing the supply of the program.

Naturally, there is also the case involved where, by executing the program read by the computer, not only the functions of the above described embodiment are realized, but also, based on the instructions of the program, the OS (operating system) and the like running on the computer performs a part or a whole of the actual processing, and by this processing, the functions of the above described embodiment are realized.

Naturally, there is also the case involved where, after the program cord read from the storage medium is written in the memory provided for a feature expansion board inserted into the computer or a feature expansion unit connected to the computer, based on the instructions of the program code, the CPU and the like provided for the feature expansion board or the feature expansion unit performs a part or a whole of the actual processing, and by that processing, the functions of the above described embodiment are realized.

The present invention is not restricted to the above described embodiments, but various modifications (include an organic combination of each embodiment) are possible based on the spirit of the present invention, and those various modifications are not excluded from the scope of the present invention.

While various examples and embodiments of the present invention have been described, it should be understood that the spirit and scope of the invention are not restricted to the specific descriptions within the present specification.

According to the above described embodiments, by the decoding of the JPEG image, it is possible to reduce the access frequency of the memory and realize the reduction in the usage capacity of the memory in the image correction processing for a multi-raster to be generated. The reduction in the access frequency of the memory can realize the effect of speeding up of the image correction processing.

As described above, the effects of the embodiments are such that the storage medium to store the image data for at least M+(N−1) lines is secured, and when it is determined that the image correction processing needs the decoding processing, the address of a storage area is set as a decoding destination, and the image correction processing for the image data is performed within the set storage area, so that, at the image processing time for the image data, the storage area to be secured is minimized, and moreover, the number of access processing times for the storage area which is required until the image processing result is obtained is sharply reduced, thereby shortening the processing time and effectively performing the image processing.

What is claimed is:

1. An image processing apparatus, comprising:
an image correction unit configured to perform window processing which refers to a target pixel and pixels surrounding the target pixel so as to execute an image correction for image data obtained by a decoding process;
a securing unit configured to secure a storage area to store image data of L=M+(N−1) lines, where M indicates a number of lines used for the window processing performed by said image correction unit and N indicates a number of lines obtained by each decoding process;
a line processing unit configured to advance a target line one by one to a last line of the storage area and then to return the target line to a first line of the storage area, during execution of the image correction by said image correction unit using the image data stored in the storage area;
an image decoding unit configured to execute the decoding process to obtain image data from the ((D×N+1) % L)-th line of the storage area if J+(M−1)/2>D×N, where D indicates a number of decoding processes, J indicates a number of lines for which the image correction has been executed, and % indicates a surplus calculation.

2. An image processing apparatus according to claim 1, wherein said image correction unit executes the image correction so as to visually reduce noise components from the image data, further comprising:
a selection unit configured to randomly select an arbitrary pixel in a window used in the window processing; and
a determination unit configured to determine a pixel value of the target pixel after correction, based on pixel values of the pixel selected by said selection unit and of the target pixel.

3. An image processing apparatus according to claim 1, wherein said image correction unit executes the image correction so as to visually reduce noise components from the image data, further comprising a determination unit configured to determine a pixel value of the target pixel after correction, based on a filtering process executed in a window used in the window processing using a matrix.

4. An image processing method, comprising:
an image correction step of performing window processing which refers to a target pixel and pixels surrounding the target pixel so as to execute an image correction for image data obtained by a decoding process;

a securing step of securing a storage area to store image data of L=M+(N−1) lines, where M indicates a number of lines used for the window processing performed by said image correction step and N indicates a number of lines obtained by each decoding process;

a line processing step of advancing a target line one by one to a last line of the storage area and then returning the target line to a first line of the storage area, during execution of the image correction by said image correction step using the image data stored in the storage area; and an image decoding step of executing the decoding process to obtain image data from the ((D×N+1) % L)-th line of the storage area if J+(M−1)/2 >D×N, where D indicates a number of decoding processes, J indicates a number of lines for which the image correction has been executed, and % indicates a surplus calculation.

5. A method according to claim 4, wherein said image correction step executes the image correction so as to visually reduce noise components from the image data, further comprising:

a selection step of selecting an arbitrary pixel in a window used in the window processing; and a determination step of determining a pixel value of the target pixel after correction, based on pixel values of the pixel selected by said selection step and of the target pixel.

6. A method according to claim 4, wherein said image correction step executes the image correction so as to visually reduce noise components from the image data, further comprising a determination step configured to determine a pixel value of the target pixel after correction, based on a filtering process executed in a window used in the window processing using a matrix.

7. A computer-readable storage medium storing a computer program that implements a method, the method comprising:

an image correction step of performing window processing which refers to a target pixel and pixels surrounding the target pixel so as to execute an image correction for image data obtained by a decoding process;

a securing step of securing a storage area to store image data of L=M+(N−1) lines, where M indicates a number of lines used for the window processing performed by said image correction step and N indicates a number of lines obtained by each decoding process;

a line processing step of advancing a target line one by one to a last line of the storage area and then returning the target line to a first line of the storage area, during execution of the image correction by said image correction step using the image data stored in the storage area; and an image decoding step of executing the decoding process to obtain image data from the ((D×N+1) % L)-th line of the storage area if J+(M−1)/2 >D×N, where D indicates a number of decoding processes, J indicates a number of lines for which the image correction has been executed, and % indicates a surplus calculation.

* * * * *